United States Patent
Farhat et al.

(10) Patent No.: US 12,525,625 B2
(45) Date of Patent: Jan. 13, 2026

(54) THERMAL MANAGEMENT SYSTEM AND METHOD FOR FUEL CELL VEHICLE HAVING A PLURALITY OF FUEL-CELL STACKS

(71) Applicant: Ford Global Technologies, LLC, Dearborn, MI (US)

(72) Inventors: Hassan Farhat, Dearborn, MI (US); Ravi Gopal, Novi, MI (US); Yixin Yao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 647 days.

(21) Appl. No.: 18/084,762

(22) Filed: Dec. 20, 2022

(65) Prior Publication Data

US 2024/0204219 A1    Jun. 20, 2024

(51) Int. Cl.
*H01M 8/04029* (2016.01)
*B60H 1/00* (2006.01)
*B60L 58/33* (2019.01)
*H01M 8/0432* (2016.01)
*H01M 8/04537* (2016.01)
*H01M 8/04746* (2016.01)

(52) U.S. Cl.
CPC ......... *H01M 8/04029* (2013.01); *B60L 58/33* (2019.02); *H01M 8/0432* (2013.01); *H01M 8/04619* (2013.01); *H01M 8/04768* (2013.01); *B60H 1/00278* (2013.01); *B60H 2001/00307* (2013.01); *B60H 1/00392* (2013.01); *B60H 1/00885* (2013.01); *H01M 2250/20* (2013.01)

(58) Field of Classification Search
CPC ......... H01M 8/04029; H01M 8/04768; H01M 8/04619; H01M 8/0432; H01M 2250/20; B60L 58/33; B60H 1/00392; B60H 1/00885; B60H 1/00278; B60H 2001/00307

See application file for complete search history.

(56) References Cited

U.S. PATENT DOCUMENTS 7,730,734 B2    6/2010    Hoshi et al.
8,822,093 B2    9/2014    Kim et al.
(Continued)

FOREIGN PATENT DOCUMENTS

WO    2004004041 A1    1/2004

*Primary Examiner* — Sarah A. Slifka
(74) *Attorney, Agent, or Firm* — Brooks Kushman PC; David B. Kelley

(57) ABSTRACT

A multiple fuel cell thermal management system controls a proportional mixing valve, heat exchanger bypass valves, fan speeds, and pump speeds of respective coolant circuits and associated fuel-cell stacks to operate the stacks independently or in combination. When vehicle wheel loads are low or in applications with standby fuel-cell stacks, selected stacks are turned off. During moderate loads or high ambient temperature, the working fuel cell cooling system(s) operates in parasitic load reduction mode, using the non-working cooling circuit(s) as a heat sink running the associated pump at low speed and throttling the proportional mixing valve such that efficient cooling is accomplished in the running circuit with less fan power required than if the non-working circuit is completely shut down. A heat exchanger bypass valve and fan speed are controlled to provide a target stack inlet temperature. Pump speed is controlled responsive to a stack inlet/outlet temperature difference.

20 Claims, 14 Drawing Sheets

(56) References Cited

U.S. PATENT DOCUMENTS

| | | |
|---|---|---|
| 11,139,491 B2 | 10/2021 | Kwon et al. |
| 11,201,341 B2 | 12/2021 | Farhat et al. |
| 2009/0266508 A1 | 10/2009 | Furuta |
| 2009/0317676 A1 | 12/2009 | Andreas-Schott et al. |
| 2010/0273079 A1 | 10/2010 | Hinsenkamp et al. |
| 2014/0120440 A1 | 5/2014 | Nolan et al. |
| 2019/0165396 A1 | 5/2019 | Farnsworth et al. |

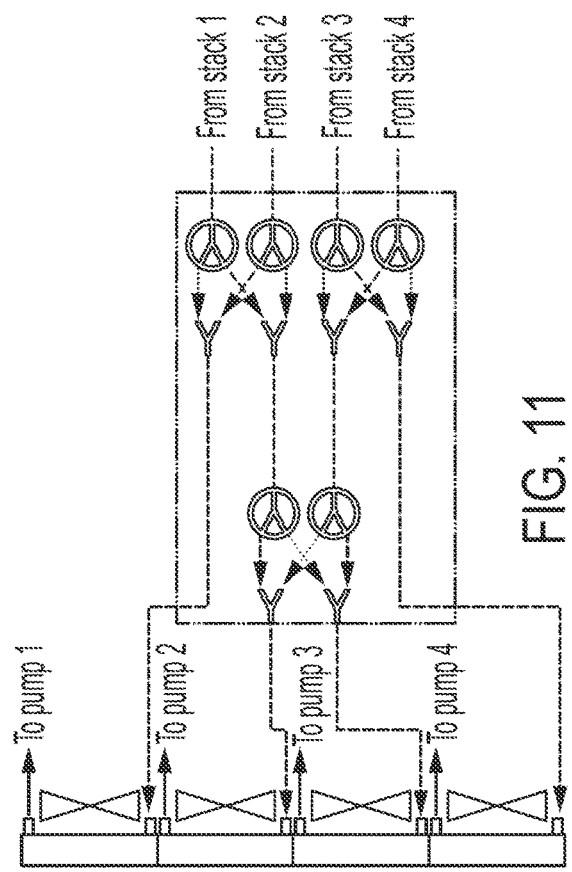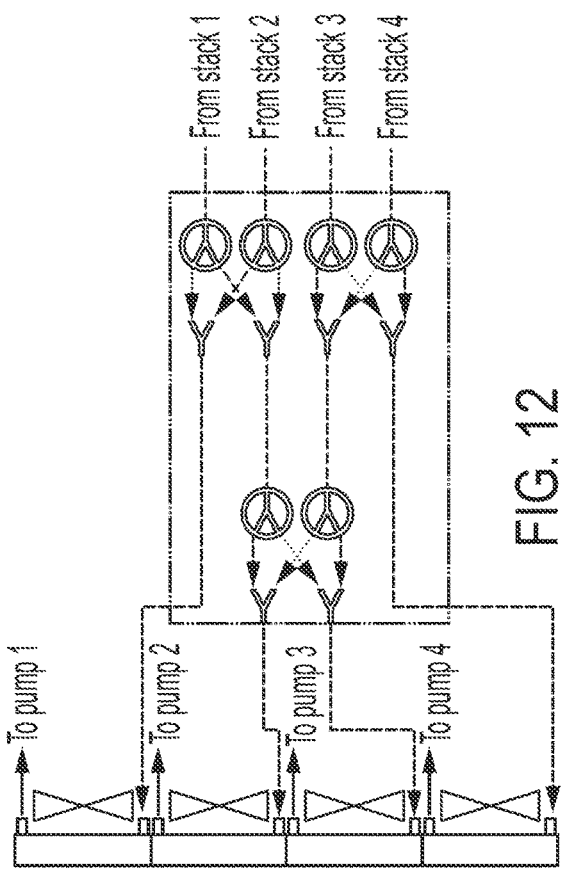

THERMAL MANAGEMENT SYSTEM AND METHOD FOR FUEL CELL VEHICLE HAVING A PLURALITY OF FUEL-CELL STACKS

TECHNICAL FIELD

This disclosure relates to a thermal management system and method for vehicle and stationary applications having two or more fuel-cell stacks.

BACKGROUND

The hydrogen fuel cell, and in particular the proton exchange membrane fuel cell (PEMFC), is one potential power source for vehicles as well as stationary applications. Larger vehicles and stationary power applications may include two or more fuel cell stacks to generate desired power for a particular application. Systems having two or more fuel cell stacks may have variations in operation and performance among the fuel cell stacks associated with component variability, aging, variations in air or coolant flow rates, unbalanced fueling, etc. As such, coordination of independent or combined control of fuel-cell stacks and thermal management of systems having two or more fuel cell stacks presents various challenges for cooling, particularly at higher load or higher ambient temperatures, and for efficient operation at low to medium loads where parasitic loads can reduce system efficiency.

SUMMARY

A fuel cell thermal management system (TMS) controls selectively isolated fuel stacks independently or in combination. When vehicle wheel loads are low or in the cases of large and stationary applications with standby fuel cell stacks, the system allows turning off selected stacks. Furthermore, during moderate loads or high ambient temperature, the working fuel cell cooling system can operate in parasitic load reduction mode, which capitalizes on using the non-working cooling circuit as an effective heat sink, especially for mobile applications with ram air. This is accomplished by running the pump in the non-operating circuit at low speed and throttling an isolation valve such that efficient cooling is accomplished in the running circuit with less fan power required relative to various prior strategies. Independent TMS controls overcome issues related to unbalanced air, coolant, and fuel distribution between stacks operating synchronously. During high load and/or high ambient temperature, the cooling circuits have the flexibility to run in separation, or in combination as one system. This enables robust control of the coolant temperature difference between the inlet and outlet of the various fuel cell stacks.

A system of one or more computers or controllers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle having first and second fuel-cell stacks. The vehicle also includes a first coolant circuit having conduit and a first pump arranged to circulate coolant through the first fuel-cell stack. The vehicle also includes a second coolant circuit having conduit and a second pump arranged to circulate coolant through the second fuel-cell stack. The vehicle also includes an isolation valve assembly configured to control flow of coolant between the first and second coolant circuits, the isolation valve assembly having an isolation position that isolates coolant in the first and second coolant circuits and at least one mixing position that directs at least a portion of coolant from the first coolant circuit to the second coolant circuit and at least a portion of coolant from the second coolant circuit to the first coolant circuit. The vehicle also includes a controller programmed to control the isolation valve assembly in response to at least one of a vehicle load and ambient temperature exceeding a respective threshold to operate in the at least one mixing position, to operate the first pump to circulate coolant through the first fuel-cell stack while the first fuel-cell stack is operating, and to operate the second pump to circulate coolant through the second fuel-cell stack while the second fuel-cell stack is shut down. Other embodiments of this aspect include corresponding computer systems, apparatus, and computer programs recorded on one or more computer storage devices, each configured to perform the actions of the methods.

Implementations may include one or more of the following features. The vehicle where the controller is programmed to operate the first pump at a first speed and the second pump at a second speed less than the first speed. The second speed is between 50%-60% of the first speed. The isolation valve assembly may include: a first inlet port connected to the conduit of the first coolant circuit; a first outlet port connected to the conduit of the first coolant circuit; a second inlet port connected to the conduit of the second coolant circuit; a second outlet port connected to the conduit of the second coolant circuit; and valving that directs coolant flow between the first and second inlet ports and the first and second outlet ports to provide: (i) the isolation position in which the first inlet port and the second outlet port are not in fluid communication and the second inlet port and the first outlet port are not in fluid communication so that the first and second circuits are isolated, and (ii) the at least one mixing position in which the first inlet port and the second outlet port are in fluid communication and the second inlet port and the first outlet port are in fluid communication so that the first and second circuits are in fluid communication. The valving includes a first valve configured to proportion coolant between the first inlet and the first and second outlets and a second valve configured to proportion coolant between the second inlet and the first and second outlets. The isolation valve assembly is designed such that the first and second valves are synchronized with each other and the proportion of coolant circulating between the first inlet and the second outlet is equal to the proportion of coolant circulating between the second inlet and the first outlet. The controller is further programmed to control the first and second valves of the isolation valve assembly to proportion coolant circulating between the first inlet and the second outlet relative to coolant circulating between the second inlet and the first outlet based on a coolant temperature difference between the first coolant circuit and the second coolant circuit. The controller is further programmed to, in response to both the first fuel-cell stack and the second fuel-cell stack operating, control the isolation valve assembly to operate in the isolation position, and control the first and second pumps to maintain a first target temperature difference between an inlet and an outlet of the first fuel-cell stack, and to maintain a second target temperature difference between an inlet and an outlet of the second fuel-cell stack. Implementations of the described techniques may include hardware, a method or process, or computer software on a computer-accessible medium.

One general aspect includes a method for controlling a vehicle. The method also includes while only one of a first fuel cell and a second fuel cell is operating, controlling at least one valve to combine coolant from a first coolant circuit having a first pump operable to circulate the coolant through the first fuel cell and a second coolant circuit having a second pump operable to circulate the coolant through the second fuel cell. The method also includes controlling the first pump and the second pump to circulate the coolant through the first coolant circuit and the second coolant circuit. Other embodiments of this aspect include corresponding computer systems, apparatus, and computer programs recorded on one or more computer storage devices, each configured to perform the actions of the methods.

Implementations may include one or more of the following features. The method where when the first fuel cell is operating and the second fuel cell is not operating, controlling the first pump and the second pump includes operating the first pump at a first speed and the second pump at a second speed, the second speed lower than the first speed. The second speed may be less than 60% of the first speed in one aspect, or less than 75% of the first speed in another aspect. The method may include: controlling speed of a first fan associated with a first heat exchanger, and a first bypass valve operable to route a least a portion of coolant of the first coolant circuit around the first heat exchanger to maintain a target inlet temperature of the first fuel cell; and controlling speed of the first pump in response to a difference between an inlet temperature and an outlet temperature of the first fuel cell. The method may include: controlling the isolation valve into a mixing position and a second bypass valve operable to route at least a portion of coolant of the second coolant circuit around the second heat exchanger; and controlling speed of the second pump to allow use of the nonfunctional fuel cell as a thermal sink and benefit from the RAM air flowing through the second heat exchanger. Implementations of the described techniques may include hardware, a method or process, or computer software on a computer-accessible medium.

One general aspect includes a system having a plurality of fuel cells. The system also includes a plurality of coolant circuits each of which is associated with a respective one of the plurality of fuel cells, each coolant circuit including a heat exchanger, a fan arranged to provide airflow to the heat exchanger, a heat exchanger bypass valve, and a pump configured to circulate coolant through the coolant circuit. The system also includes an isolation valve assembly coupled to each pair of coolant circuits and configured to control coolant flow between the coupled pair of coolant circuits. The system also includes a controller configured to control each heat exchanger bypass valve and fan speed in response to an inlet temperature of a respective one of the plurality of fuel cells, and to control each pump speed in response to a delta temperate between an inlet and outlet of the respective one of the plurality of fuel cells. Other embodiments of this aspect include corresponding computer systems, apparatus, and computer programs recorded on one or more computer storage devices, each configured to perform the actions of the methods.

Implementations may include one or more of the following features. The system where the controller is further programmed to control the isolation valve assembly to isolate the coolant circuits of the coupled pair of coolant circuits from one another. The controller is further programmed to, in response to at least one of load and ambient temperature exceeding an associated temperature: control the proportional valve assembly to mix coolant between the coupled pair of coolant circuits; operate a first fuel cell associated with a first one of the coupled pair of coolant circuits, and shutdown a second fuel cell associated with a second one of the coupled pair of coolant circuits; and control a first pump associated with the first one of the coupled pair of coolant circuits to operate at a first speed and a second pump associated with the second one of the coupled pair of coolant circuits of the coupled pair of coolant circuits to operate at a second speed less than 75% of the first speed. The controller is further programmed to, for each operating fuel cell of the plurality of fuel cells: control an associated heat exchanger bypass valve to selectively route at least a portion of coolant around an associated heat exchanger and control speed of an associated fan to maintain a target inlet temperature of an associated fuel cell; and control speed of an associated pump in response to a difference between an inlet temperature and an outlet temperature of the associated fuel cell.

BRIEF DESCRIPTION OF THE DRAWINGS

FIG. 11 is a diagram illustrating a first representative control mode for a multi-stack configuration.

FIG. 12 is a diagram illustrating a second representative control mode for a multi-stack configuration.

DETAILED DESCRIPTION

Figure 1:
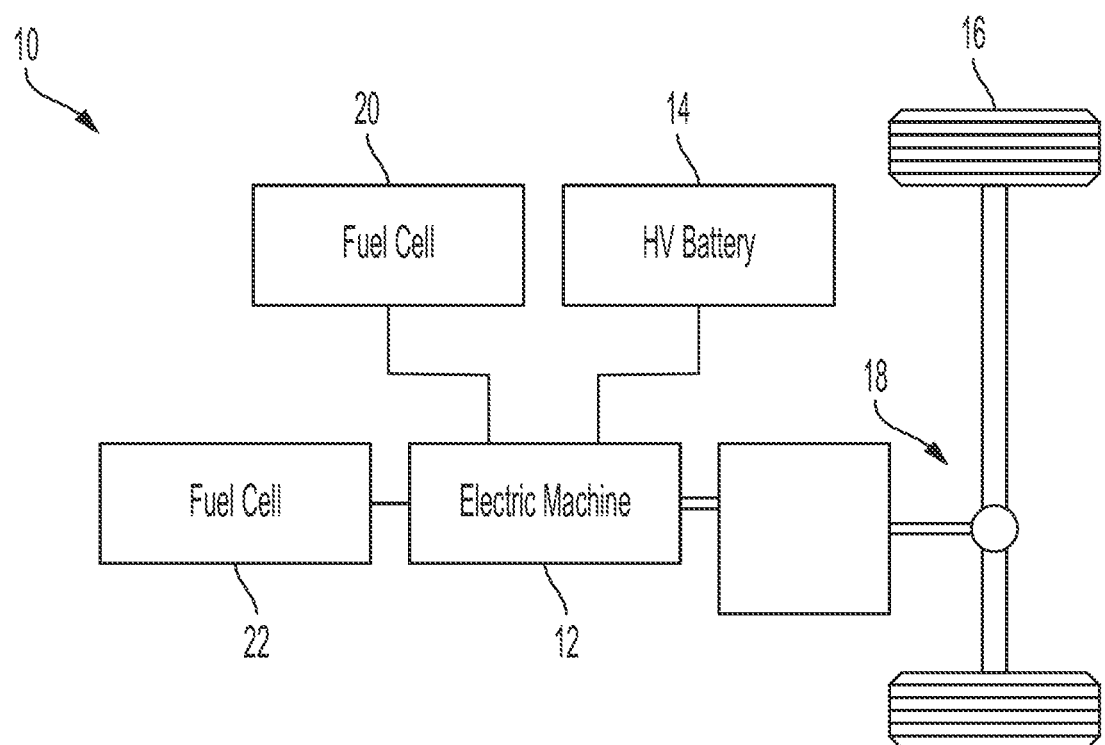
FIG. 1 is a schematic of a fuel-cell vehicle with two or more fuel cells.

Representative examples of the claimed subject matter are described herein. It is to be understood, however, that the disclosed examples can take various and alternative forms that may not be explicitly described or illustrated. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce additional representative examples although the specific combination of features is not explicitly illustrated or described. The combinations of features illustrated provide representative configurations and examples for typical applications. Various combinations and modifications of the features consistent with the teachings of this disclosure, however, could be desired for particular applications or implementations.

A PEMFC includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally manage the fuel cell.

Several unit cells are typically combined in a fuel-cell stack to generate the desired power. For example, the stack may include two-hundred or more unit cells arranged in series. The fuel-cell stack receives a cathode reacting gas, typically a flow of air forced through the stack by a compressor. Not all the oxygen is consumed by the stack and some of the air is output as a cathode exhaust gas that may include water as a stack byproduct. The fuel-cell stack also receives an anode hydrogen reacting gas that flows into the anode side of the stack. As used herein, a fuel cell and fuel-cell stack are used interchangeably.

Referring to FIG. 1, a vehicle 10 includes a first fuel-cell stack 20 and a second fuel-cell stack 22 for providing electrical power to at least one electric machine 12. The vehicle 10 may also include a traction battery 14 electrically connected to the fuel cells 20, 22 and the electric machine 12. The electric machine 12 is connected to the driven wheels 16 via a drivetrain 18. During operation of the vehicle 10, hydrogen fuel and air are fed into the fuel cell 20 creating electrical power. The electric machine 12 receives the electrical power as an input, and outputs torque for driving the wheels 16 to propel the vehicle 10.

The fuel-cell stacks 20, 22 generate heat during operation and include an associated thermal management system for controlling or managing the temperature of the stacks. In addition to cooling the stacks 20, 22, the thermal management system is also configured to heat the stacks. It is difficult to start a fuel cell in very cold ambient conditions such as below −25 degrees Celsius (C) for example. (Starting a fuel cell when the temperate is below a threshold may be referred to as cold start.) To reduce energy consumption during cold start, the fuel-cell stacks 20, 22 may be preheated (also known as preconditioning) by circulating heated coolant through one or more of the stacks 20, 22. Once the stack reaches a threshold temperature, such as −25 degrees, the fuel cell is started. This of course is just an example temperature and the threshold temperature will vary based on fuel cell design and other factors. The preheating can end once the fuel cell is started as heat from the chemical reactions will self-heat the fuel-cell stack to a desired operational temperature, at which point active cooling may be required. The preheating may be performed by an electric heater such as a positive temperature coefficient (PTC) heater that converts electricity, typically provided by the battery 14, into heat.

Figure 2:
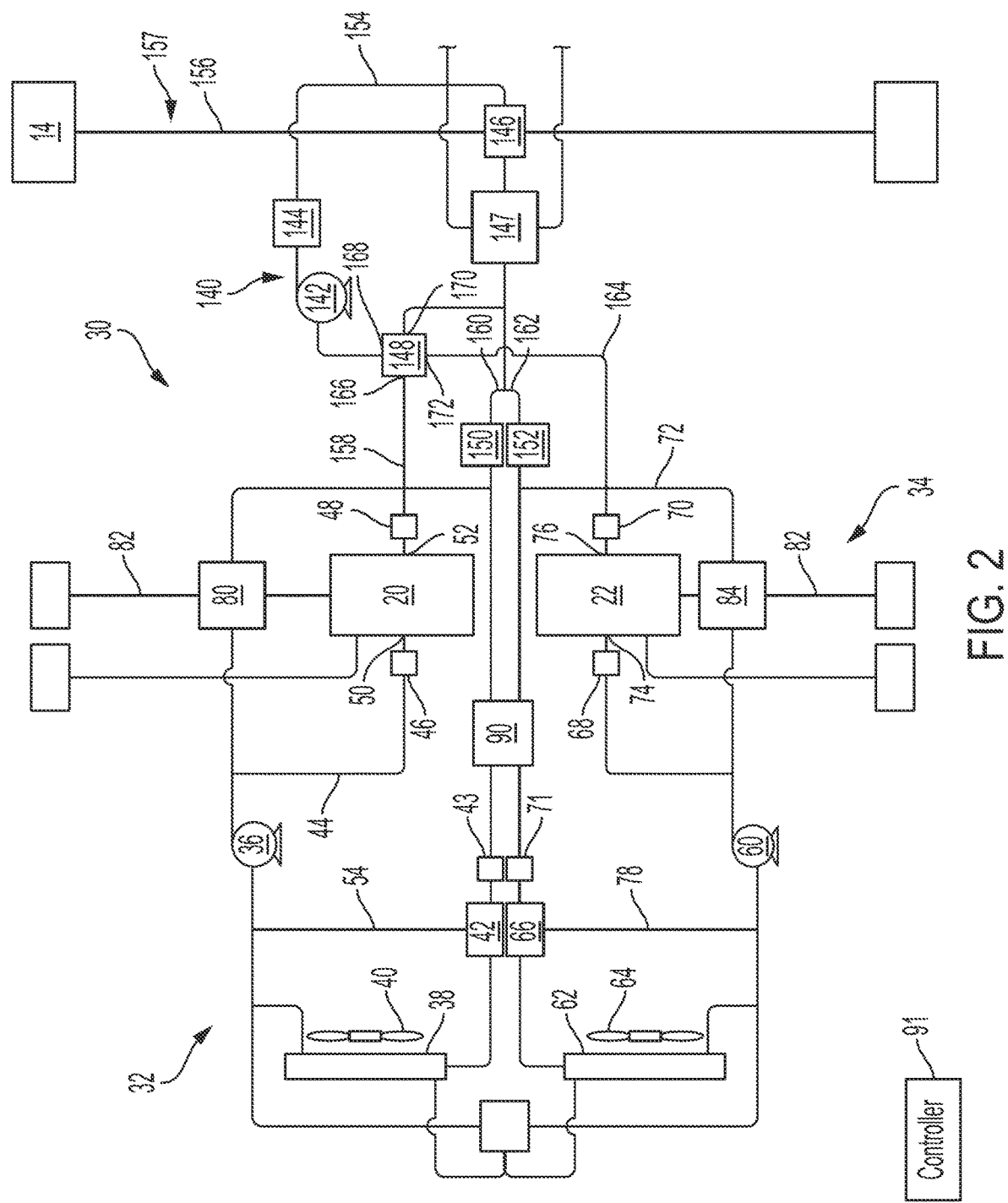
FIG. 2 is a schematic diagram of a thermal management system of a fuel cell vehicle with two or more fuel cells.

The following figures and related text describe an example thermal management system of the vehicle 10. Referring to FIG. 2, a thermal management system 30 thermally manages at least the first and second fuel-cell stacks 20, 22 and may also be responsible for thermal management of traction battery 14 and supplying heat to the passenger cabin. The thermal management system 30 uses liquid coolant, such as ethylene glycol mixed with deionized water, as the working fluid. The thermal management system 30 may include a first coolant circuit 32 associated with the first stack 20 and a second coolant circuit 34 associated with the second stack 22.

The first circuit 32 may include a pump 36, a heat exchanger or radiator 38 with an associated fan 40, a bypass valve 42 (e.g., an electric three-way valve or wax thermostat), temperature sensors 46, 48, and conduit 44 that is a collection of multiple lines, hoses, pipes, tubes, etc., arranged to form a closed loop. In the illustrated embodiment, the valve 42 is an electric three-way valve and a temperature sensor 43 is provided to determine actuation of the valve 42. While not shown, the first circuit 32 may include a pressure sensor and other flow control devices such as check valves. The conduit 44 carries the coolant through the associated components of the first coolant circuit 32. The term "conduit" may refer to the collection of all conduit of the circuit 32 or a specific segment(s) of the conduit depending upon context. The first circuit 32 is configured to heat or cool the stack 20 depending upon the relative temperatures of the coolant and the fuel-cell stack 20. When the system is active, the pump 36 circulates coolant into an inlet 50 of the stack 20, the coolant then travels through the internal cooling system of the stack 20 exchanging thermal energy, and exits via an outlet 52. From there, the conduit 44 conveys the coolant to the valve 42. The bypass valve 42 operates to either route the coolant to the radiator 38 if the coolant is above a temperature threshold or bypasses the radiator via the bypass line 54. The valve 42 may be modulated or otherwise configured to proportion coolant between the radiator 38 and the bypass line 54. The fan 40 is arranged to increase air flow through the radiator 38 if needed. The fan 40 may be a variable speed fan with the fan speed electronically controlled by a vehicle controller. The temperature sensor 46 may be located just upstream of the fuel-cell stack 20 to measure the temperature of the coolant at the inlet 50. The temperature sensor 48 may be located just downstream of the fuel cell 20 to measure temperature of the coolant at the outlet 52.

The second circuit 34 may include a pump 60, a radiator 62 with an associated fan 64, a valve 66 (e.g., an electric three-way valve or a wax thermostat), temperature sensors 68, 70, 71, and conduit 72 that is a collection of multiple lines, hoses, pipes, tubes, etc., arranged to form a closed loop. The conduit carries the coolant through the associated components of the first coolant circuit 34. The second circuit 34 is configured to heat or cool the stack 22 depending upon the relative temperatures of the coolant in the fuel-cell stack. When the system is active, the pump 60 circulates coolant into an inlet 74 of the stack 22, the coolant then travels through the internal cooling system of the fuel cell exchanging thermal energy, and exits via an outlet 76. From there, the conduit 72 conveys the coolant to the valve 66. The valve 66 operates or is controlled to either route the coolant to the radiator 62 if the coolant is above a corresponding threshold or bypasses the radiator via the bypass line 78. The valve 66 may be modulated or otherwise configured to proportion coolant between the radiator 62 and the bypass line 78. The fan 64 is arranged to increase air flow through the radiator 62 if needed. The fan 64 is a variable speed fan with fan speed electronically controlled by a vehicle controller. The temperature sensor 68 may be located just upstream of the fuel-cell stack 22 to measure the temperature of the coolant at the inlet 74. The temperature sensor 70 may be located just downstream of the fuel cell 22 to measure temperature of the coolant at the outlet 76.

The first and second coolant circuits 32 and 34 may also be used to cool or heat the compressed air supplied to the fuel cells 20, 22. An intercooler 80 is connected to the conduit 44 and a compressed-air line 82. The intercooler 80 is configured to exchange heat between the compressed air and the coolant. An intercooler 84 is connected to the conduit 72 and a compressed air line 86. The intercooler 84 is configured to exchange heat between the compressed air and the coolant.

A valve assembly or arrangement 90 selectively connects the first circuit 32 and the second circuit 34 in fluid communication. A valve arrangement is a collection of one or more valves configured to modify fluid flow between one or more inlet ports and one or more outlet ports. A valve arrangement may include multiple valves housed in a common body or multiple discrete valves acting in unison with each other. The valve arrangement may be passive or electrically controlled. Example valve arrangements include two-way valves, three-way valves, four-way valves, check valves, an isolation valve, and the like. When the valve arrangement 90 is closed or operating in an isolation position, the first and second circuits 32, 34 are separate and the coolant in those circuits does not mix. When the valve arrangement 90 is open or operated in a mixing position, the first and second circuits 32, 34 are in fluid communication with each other and the coolant mixes. The valving arrangement 90 may be electronically controlled by controller (such as controller 91) to connect or couple the first and second circuits 32, 34 in fluid communication and to isolate the first and second circuits 32, 34. Used herein "isolate" means to sever or prevent fluid communication. The controller 91 may be programmed to actuate the valve arrangement 90 between the closed position and a plurality of different open positions (sometimes called mixing positions) that proportion the amount of coolant mixing between first and second circuits.

Figure 3:
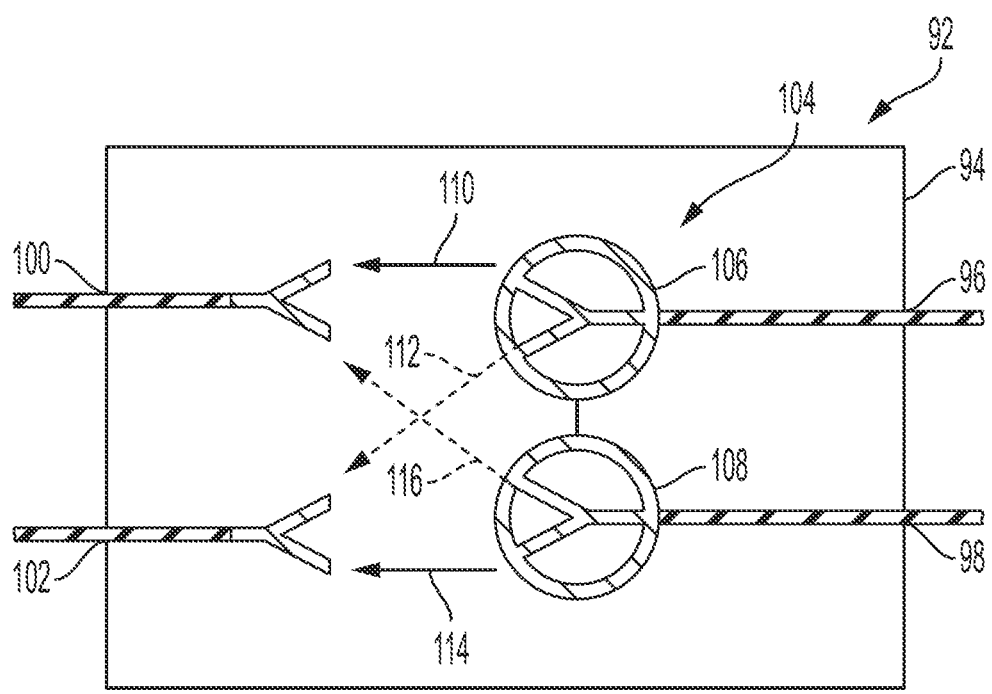
FIG. 3 is a schematic diagram of a valve arrangement that may be used to control a TMS in a vehicle having two or more fuel cells.

Referring to FIG. 3, according to one or more embodiments, the valve arrangement 90 is an isolation valve assembly 92, also referred to as a proportional mixing valve that may provide isolation with no mixing, or proportional mixing as described herein. Valve assembly 92 includes a housing 94 with ports and valving. For example, the housing 94 may include a first inlet port 96, a second inlet port 98, a first outlet port 100, and a second outlet port 102. The first inlet port 96 and the first outlet port 100 are connected to the conduit 44 of the first circuit 32, and the second inlet port 98 and the second outlet port 102 are connected to the conduit 72 of the second circuit 34. Valving 104 is disposed in the housing 94 and controls the flow of fluid between the inlet and outlet ports.

In the illustrated embodiment, the valving 104 includes a first valve 106 and a second valve 108. The first valve 106 is associated with the first inlet port 96 and controls the flow of fluid from the inlet port 96 between the first and second outlet ports 100 and 102. A first fluid path 110 connects between the inlet port 96 and the outlet port 100 and the second fluid path 112 connects between the inlet port 96 and the outlet port 102. The valve 106 is configured to proportion coolant between the paths 110 and 112 depending upon the position of the valve 106. The valve 106 includes a first position in which all of the fluid flows from the inlet port 96 to the outlet port 100, a second position in which all the fluid flows from the inlet port 96 to the outlet port 102, and intermediate positions in which coolant flows through both the first path 110 and the second path 112. The second valve 108 is associated with the second inlet port 98 and controls the flow of fluid from the inlet port 98 between the first and second outlet ports 100 and 102. A third fluid path 114 connects between the inlet port 98 and the outlet port 102 and a fourth fluid path 116 connects between the inlet port 98 and the outlet port 100. The valve 108 is configured to proportion coolant between the paths 114 and 116 depending upon the position of the valve. The valve 108 includes a first position in which all of the fluid flows from the inlet port 98 to the outlet port 102, a second position in which all the fluid flows from the inlet port 98 to the outlet port 100, and intermediate positions in which coolant flows through both the third path 114 and the fourth path 116.

When the isolation valve assembly 92 is in the closed position, the valves 106 and 108 are in their first positions so that fluid flows only through the first path 110 and the third path 114. When the isolation valve assembly 92 is in the fully open position, the valves 106 and 108 are in their second positions so that fluid flows only through the second path 112 and the fourth path 116. When the isolation valve assembly 92 is in one or more partially open positions, the valves 106 108 are in one of their intermediate positions so that the fluid flows through all four paths 110, 112, 114, and 116. The valves 106 and 108 may be synchronized so that movement of the valve 106 results in a proportional movement of the valve 108 and vice versa. For example, if the valve 106 is actuated so that 80 percent of the coolant is routed to the first outlet 100 and 20 percent of the coolant is routed to the outlet 102, the valve 108 is actuated so that 80 percent of the coolant is routed to the second outlet 102 and 20 percent of the coolant is routed to the first outlet 100.

The valve arrangement 90 may also be implemented by two three-way valves and associated conduit. The first three-way valve may be configured to route all the coolant to one outlet or proportion coolant between two outlets. Similarly, the second three-way valve may be configured to route all the coolant to a first outlet, all of the coolant to a second outlet, or proportion coolant between both outlets. Of course, other proportional mixing valve or isolation valve configurations are possible depending on the particular application and implementation and the representative examples are not limiting.

Referring again to FIG. 2, the thermal management system 30 also includes a third coolant circuit 140 associated with the traction battery 14 and the heating ventilation and air-conditioning system (HVAC) system. The third circuit 140 may include a pump 142, a heater 144, heat exchanger 146, a heater core 147, a valve 148 (e.g., a four-way valve), an ON-OFF valve 150, an ON-OFF valve 152, and conduit 154 configured to circulate coolant between these various components. (The valves 150 and 152 may be referred to as a valve arrangement). The heater 144 may be an electric heater configured to convert electricity into thermal energy that heats the coolant. For example, the heater 144 may be a positive temperature coefficient (PTC) heater. The heater core 147 may be disposed within the HVAC unit and transfers heat from the coolant of the third circuit 140 to air bound for the passenger cabin. The heat exchanger 146 may be a liquid-to-liquid heat exchanger. The heat exchanger 146 is connected to the conduit 154 and to conduit 156 of the battery cooling circuit 157. The heat exchanger 146 is configured to transfer thermal energy between the conduit 154 and the conduit 156 without mixing the fluids.

Four conduits connect the third circuit 140 to the first and second circuits 32, 34. A conduit 158 connects the first circuit 32 to the third circuit 140 at the valve 148, and a conduit 164 connects the second circuit 34 to the third circuit 140 at the valve 148. Additional conduit 160 and 162 connect to the circuits together as well. The conduits may act as return conduit to the first and second circuits. The valves 148, 150, and 152 open and close in cooperation to fluidly connect the third circuit 140 to the first circuit 32 and/or the second circuit 34, and to isolate the third circuit. The circuit 140 can be isolated from circuits 32 and 34 via the four-way valve by blocking conduit 158 and conduit 164 and allowing flow through the port 170.

According to one embodiment, the valve 148 is a four-way valve that includes a first port 166 connected to the conduit 158, a second port 168 supplying coolant to the pump 142, third port 170, and fourth port 172. The ports 166, 170, and 172 may be inlet ports and the port 168 may be an outlet port. The inlet ports may be individually controlled between opened, closed, and/or throttled positions (in some embodiments, only ports 166 and 172 are proportional). The four-way valve 148 may be electronically controlled by the controller 91. The valves 150 and 152, which may also be controlled by the controller 91, control the flow of fluid through the conduits 160 and 162, respectively.

As described above, it is difficult to start a fuel cell when the temperature is below a certain threshold. The fuel cell may be warmed above a starting temperature (temperature sufficient for reliable starting) using a heater, e.g., heater 144, powered by the battery 14. Heating coolant using electricity is inefficient and it is advantageous to utilize the heater 144 as little as possible so that more of the stored energy in the battery 14 can be used for propulsion. According to one embodiment, the heater 144 is used to heat only one of the fuel-cell stacks 20, 22 in a preconditioning step. In this example, the stack 20 is heated. Once the fuel-cell stack 20 reaches the starting temperature, that fuel-cell stack 20 is started and the heater 144 is turned OFF (unless cabin or battery heating requires use of the heater 144). The fuel-cell stack 20 continues to run heating itself up. Once the coolant of the first circuit reaches a threshold temperature, waste heat from the fuel-cell stack 20 is used to precondition the second fuel-cell stack 22. The second fuel-cell stack 22 can be started once it reaches its starting temperature.

Figure 4:
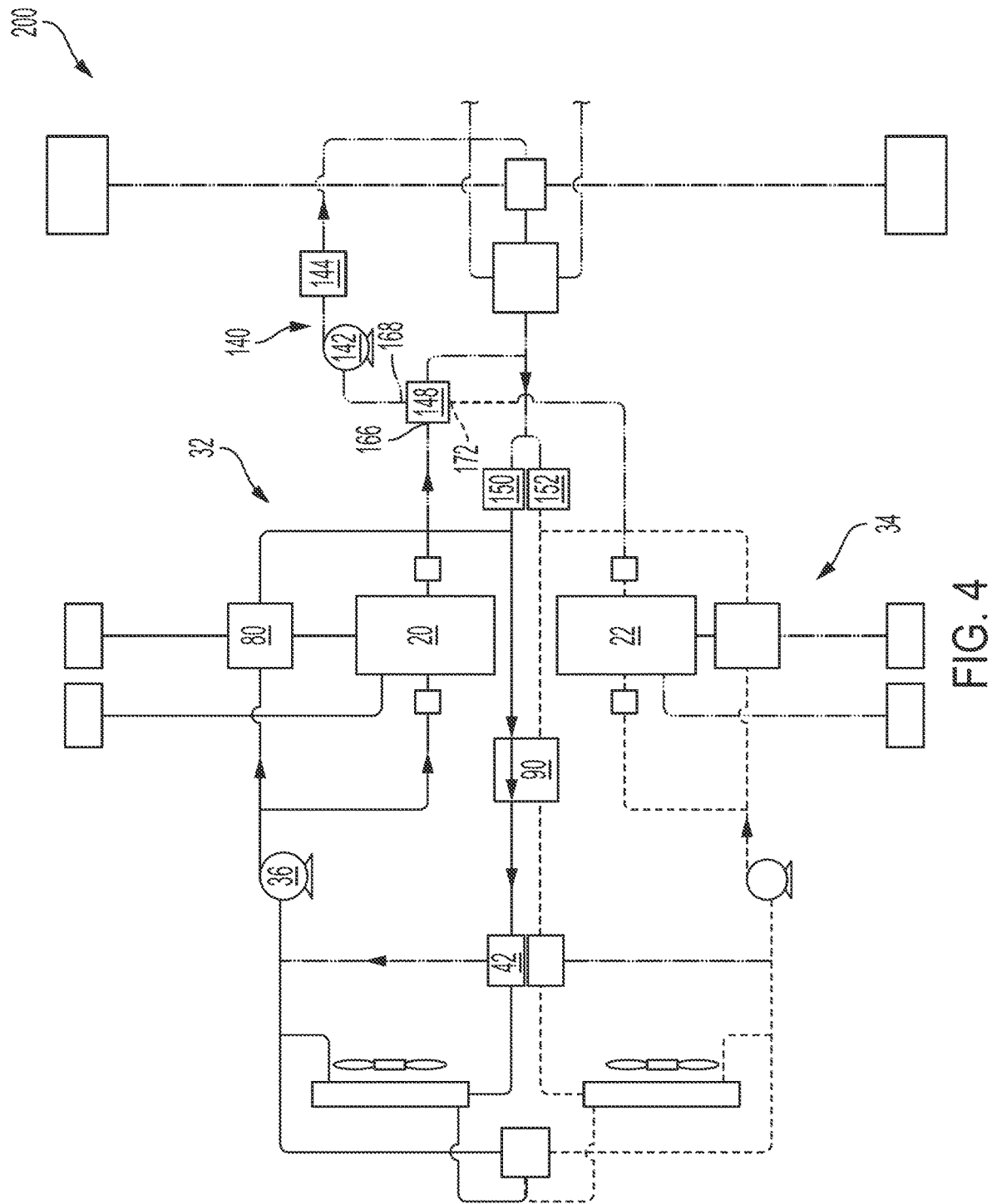
FIG. 4 is a schematic diagram of a TMS operating in a parasitic load reduction mode.

The thermal management system 30 includes a plurality of different operating and control modes. Representative examples of these modes will be illustrated and described with respect to FIGS. 4-15. FIG. 4 is a schematic diagram of a TMS operating in a parasitic load reduction mode. Bold solid lines represent active coolant flow for the operating fuel cell while dashed lines represent coolant flow at a lower flow rate associated with a lower pump speed of the coolant circuit for the inactive or shut-down fuel cell according to the present disclosure. Hash marks represent conduit with no coolant flow. Coolant flow for various other operating modes represented by the control strategy illustrated in FIGS. 5-9 is not explicitly illustrated but will be recognized and understood by those of ordinary skill in the art based on the activation of various valves, pumps, fans, etc. as described with respect to the control strategy. As described in greater detail herein, the control strategy and corresponding system components and configuration provide independent control of various components associated with a particular fuel cell and facilitate operation of systems with two or more fuel cells operating in isolation or in combination. As previously described, coolant circuits associated with inactive fuel cells may function as a heat sink (or source) for thermal management of the operating fuel cell(s). Operating a selectively coupled coolant circuit at a lower flow rate (and corresponding lower pump speed and/or fan speed) may provide various advantages with respect to parasitic load reduction and overall system thermal management and operating efficiency.

In the representative diagram of FIG. 4, fuel cell 20 is operating while fuel cell 22 is inactive and not producing power. In various prior art strategies, the coolant circuit associated with fuel cell 22 is also not actively operating while fuel cell 22 is inactive. While systems and methods according to the present disclosure may also control the system such that the coolant circuit associated with fuel cell 22 is inactive while fuel cell 22 is inactive, such as under lower vehicle wheel loads and/or lower ambient temperatures, one or more embodiments according to the disclosure operate the otherwise inactive coolant circuit as a heat sink to provide parasitic load reduction rather than increasing fan speed and pump speed of the coolant circuit associated with the active fuel cell 20 as vehicle wheel load or ambient temperature increases above respective designated thresholds. Stated differently, although systems and methods according to the present disclosure allow complete shut-down and separation of the corresponding coolant circuit subloop associated a non-operating fuel cell 22, it may be undesirable to run higher loads and/or operate at higher ambient temperatures with one the coolant circuit of the non-operating fuel cell 22 turned off, since this may require high fan and pump speed, i.e. high power consumption and associated increased noise, vibration, and harshness (NVH). Using the coolant circuit associated with the inactive fuel cell 22 as a sink provides an opportunity for parasitic load reduction.

As a representative example in a vehicle application with a total thermal load of 75 kW at 38° C. ambient, with fuel cell 22 inactive and associated cooling circuit 34 used as a sink, proportional mixing or isolation valve 90 controlled to a mixing position providing 100% flow mix between first cooling circuit 32 and second cooling circuit 34, pump 36 controlled to 4500 rpm, and pump 60 controlled to less than 75% or preferably less than 60% of pump 36 (in this example 2500 rpm or 55.6% of pump 60). Variable speed fan 40 and fan 64 are both controlled to operate at 3500 rpm with ram air through radiator 38 and 62 estimated via 3D Computational Flow Dynamics as 0.5 kg/s. Under a maximum load condition for use of a single fuel cell stack, simulated energy load corresponds to less than 1 kW as follows: fans 40, 64: 2*0.34=0.68 kW; pump 36: 1*0.27=0.27 kW; pump 60: 1*0.042=0.042 kW; total energy required: 0.99 kW.

During high load, high ambient temperatures, the cooling circuits 32, 34 have the flexibility to run in separation, or as one system. This enables robust control of the coolant temperature difference between the inlet and outlet of the various fuel cell stacks as described in greater detail herein. The flexibility of the system minimizes related parasitic loads from the non-working and working fuel cell stack cooling circuits, increases durability (allowing to switch between the fuel cell stacks during low load or split the load between or among stacks for high power demand such that stacks work at their peak efficiency).

As generally illustrated in FIG. 4, vehicle 200 includes a first fuel-cell stack 20 and second fuel-cell stack 22, a first coolant circuit 32 having conduit and a first pump 36 arranged to circulate coolant through the first fuel-cell stack 20, a second coolant circuit 34 having conduit and a second pump 60 arranged to circulate coolant through the second fuel-cell stack 22, an isolation valve assembly 90 configured to control flow of coolant between the first 32 and second 34 coolant circuits, the isolation valve assembly 90 having an isolation position that isolates coolant in the first and second coolant circuits 32, 34 and at least one mixing position that directs at least a portion of coolant from the first coolant circuit 32 to the second coolant circuit 34 and at least a portion of coolant from the second coolant circuit 34 to the first coolant circuit 32, and a controller 91 programmed to control the isolation valve assembly 90 in response to at least one of a vehicle load and ambient temperature exceeding a respective threshold to operate in the at least one mixing position, to operate the first pump 36 to circulate coolant through the first fuel-cell stack 20 while the first fuel-cell stack is operating, and to operate the second pump 60 to circulate coolant through the second fuel-cell stack 22 while the second fuel-cell stack is shut down.

Control logic or functions performed by controller 91 may be represented by flow charts or similar diagrams in one or more figures including, but not limited to, FIGS. 5-9. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 91. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
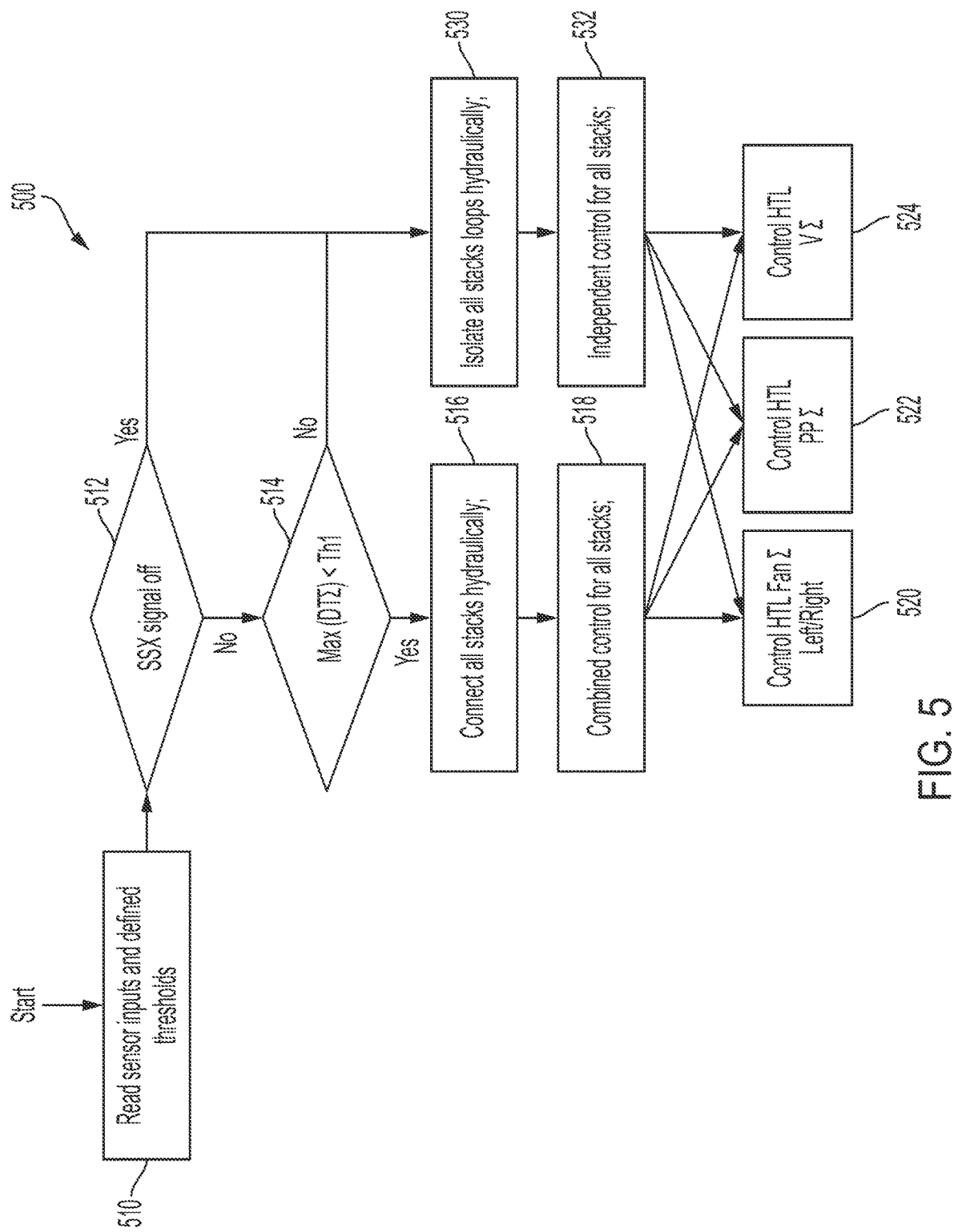
FIG. 5 is a diagram illustrating operation of a system or method for controlling a TMS having two or more fuel cells.

FIG. 5 is a simplified diagram illustrating operation of a system or method for controlling a TMS having two or more fuel cells. Operation of system or method 500 begins with obtaining sensor inputs and associated control thresholds as represented at 510. Various sensors may be monitored to provide signals relative to inlet temperature and outlet temperature of each fuel-cell stack, ambient temperature, etc. One or more thresholds may be retrieved from memory accessible by controller 91, including thresholds for fuel-cell stack inlet/outlet delta temperature, temperature threshold for maximum fan speed, temperature thresholds for opening/closing/modulating heat exchanger bypass valves, thresholds for minimal pump flow, thresholds for enabling waste heat recovery, etc. Block 512 determines or identifies which fuel-cell stacks are operating to meet current power generation demands, where SSX represents an operating signal for stack "X" of a multi-stack system. If all stacks are operating, block 514 determines whether the maximum delta inlet/outlet temperature of all operating stacks is less than a corresponding threshold. If yes, block 516 connects the coolant circuits of the operating stacks by controlling corresponding proportional mixing valves and block 518 implements a combined control for all operating stacks by control of corresponding fans, pumps, and bypass valves as represented by blocks 520, 522, and 524.

If one or more fuel-cell stacks are shut down as represented at 512, or if the maximum delta inlet/outlet temperature of all operating fuel cells exceeds a corresponding threshold at 514, then block 530 controls the corresponding proportional mixing valves to isolate the coolant circuits of all stacks as represented at 530, and block 532 performs independent control for all stacks by controlling associated fan speeds as represented at 520, pump speeds as represented at 522, and heat exchanger bypass valves as represented at 524.

Figure 6:
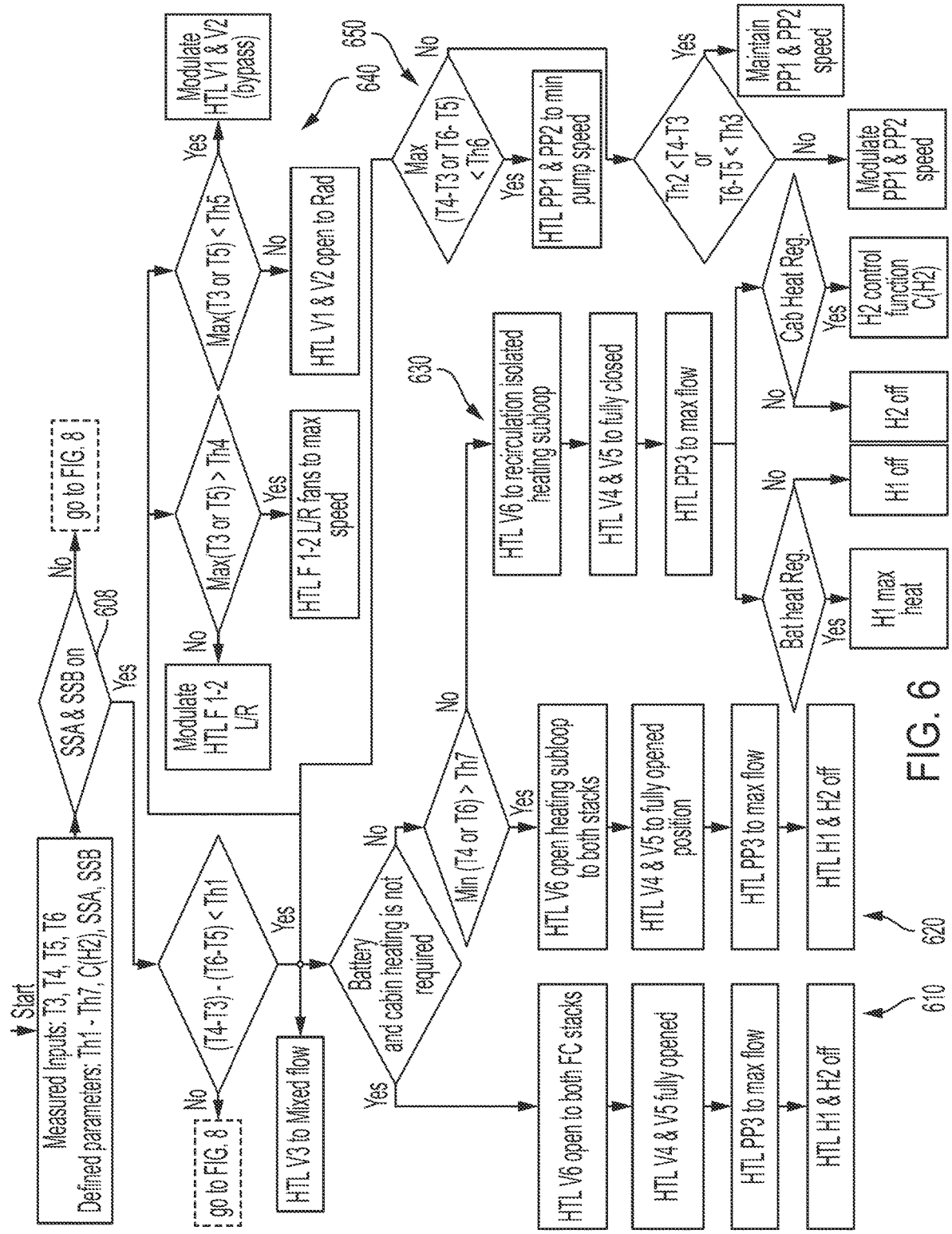
FIG. 6 is a diagram illustrating operation of a system or method for controlling a TMS operating in a combined fuel-cell stacks mode.
Figure 7A:
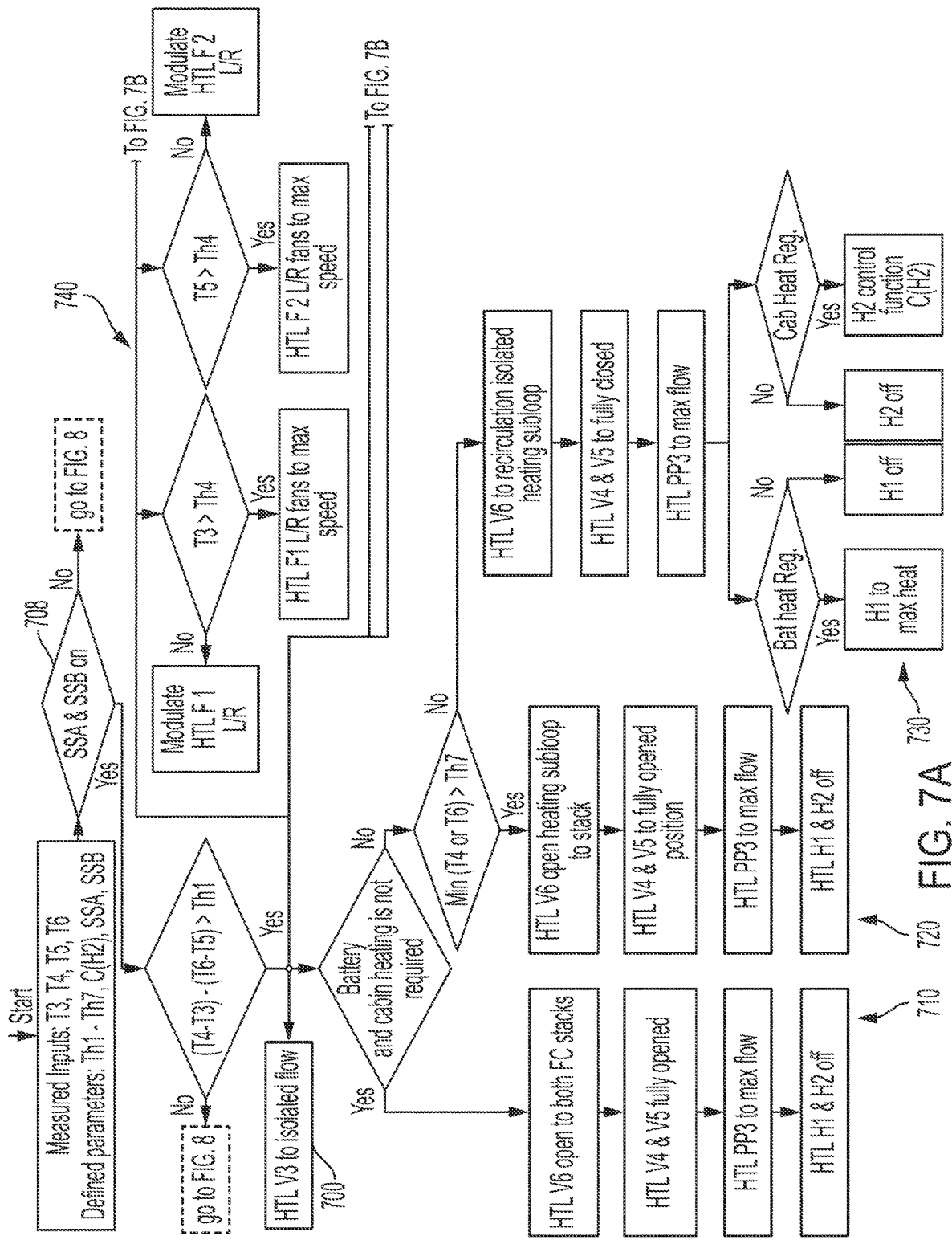
FIG. 7 is a diagram illustrating operation of a system or method for controlling a TMS operating in an independent fuel-cell stacks mode.
Figure 7B:
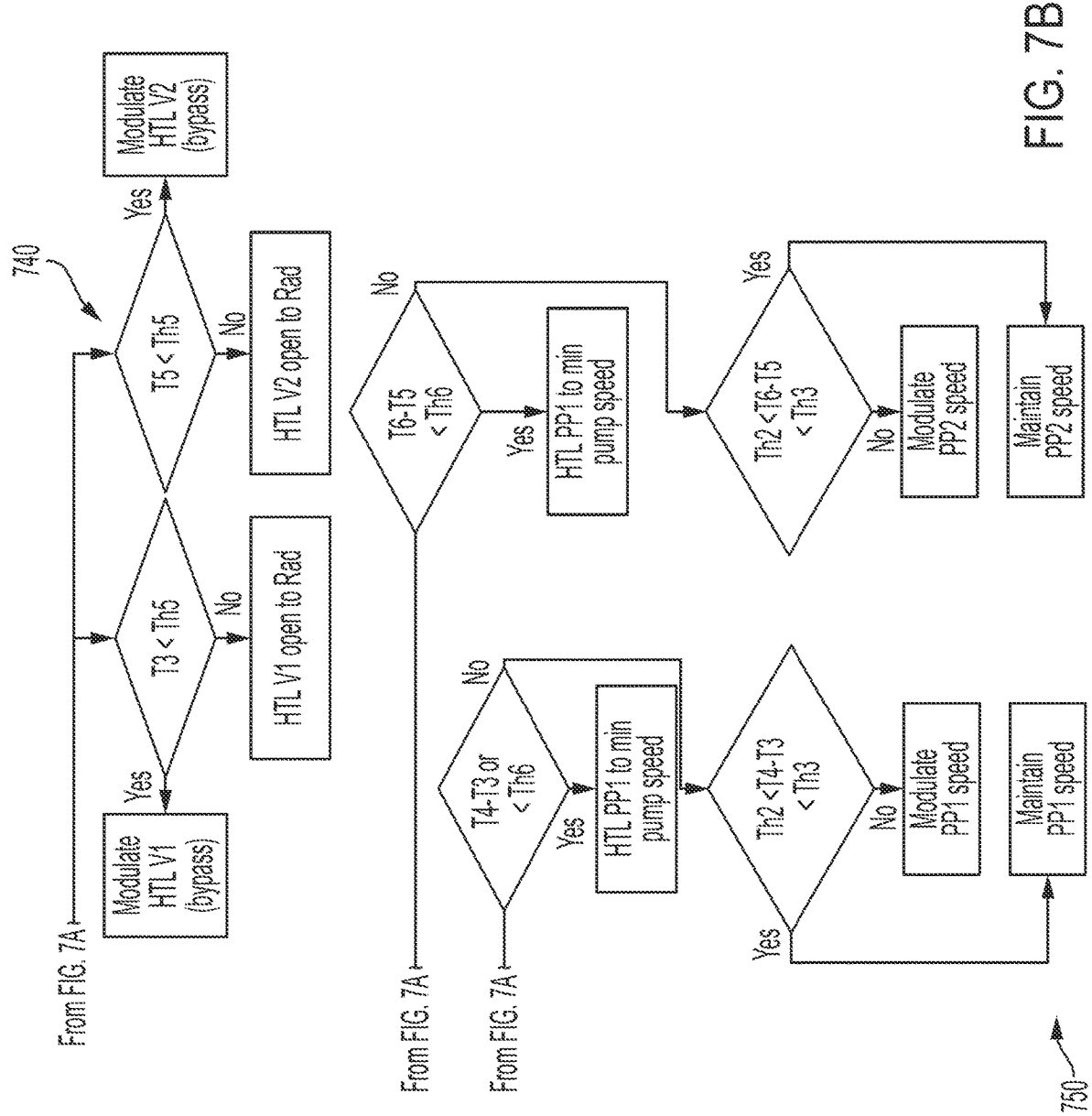
Figure 8A:
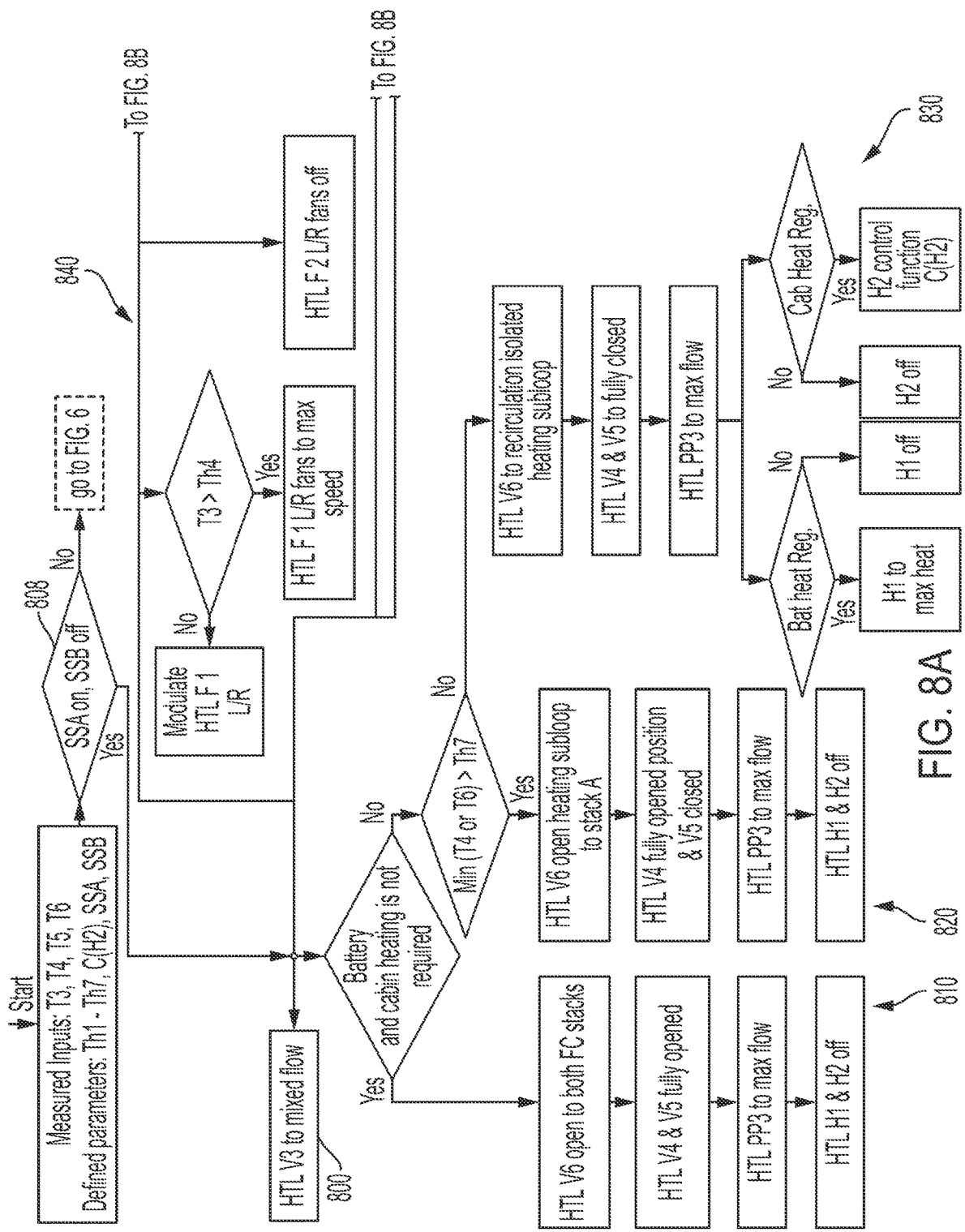
FIG. 8 is a diagram illustrating operation of a system or method for controlling a TMS operating with a first fuel-cell stack on and a second fuel-cell stack off.
Figure 8B:
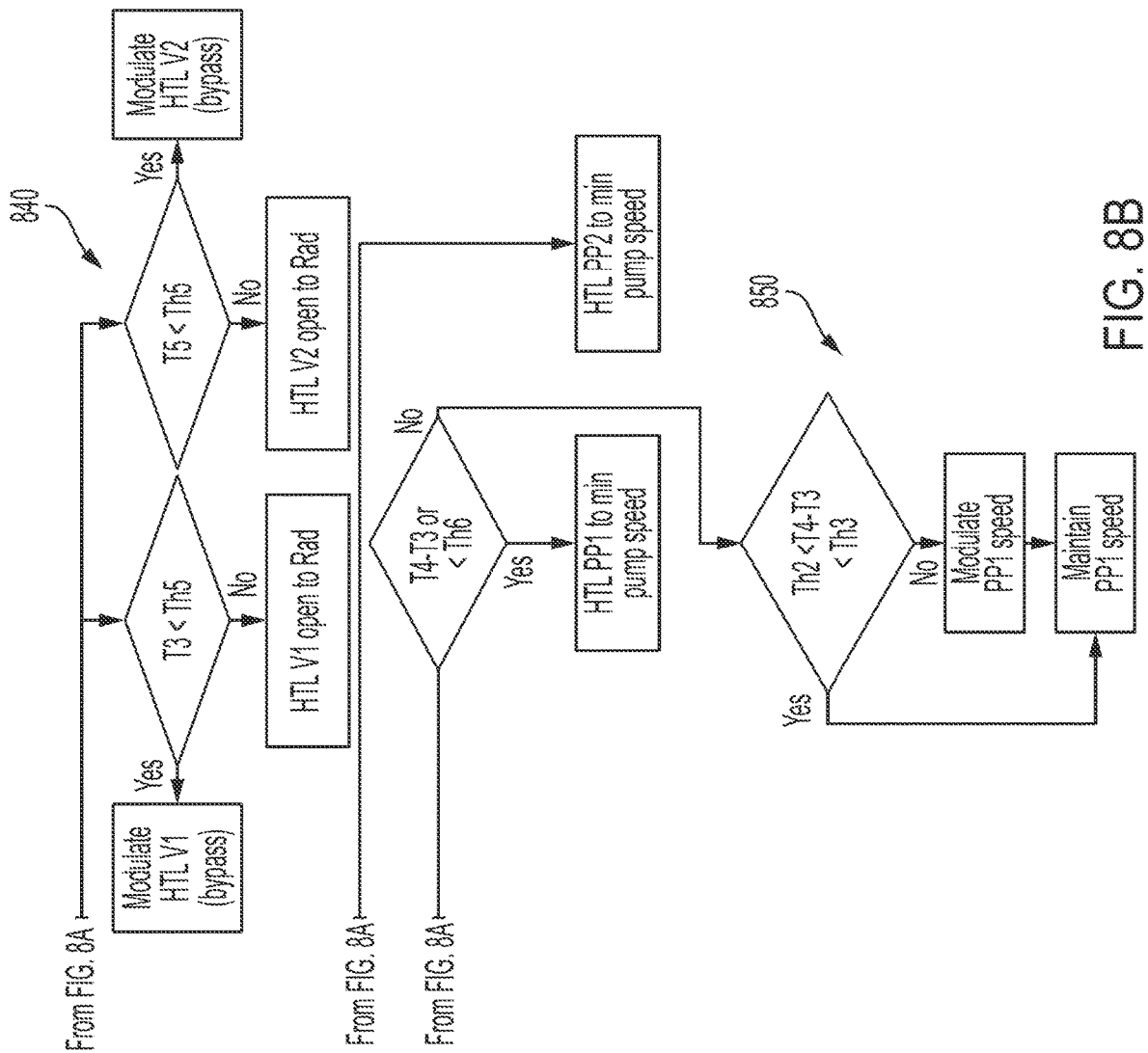

FIGS. 6-8 illustrate operation of a system or method having two fuel-cell stacks (A and B) similar to the representative vehicle system illustrated in FIGS. 1-4, and can be generalized to systems and methods having more than two fuel-cell stacks as generally represented in FIGS. 10-15. FIG. 6-8 are more detailed representations of the simplified control diagram of FIG. 5 illustrating operation of a two fuel-cell stack system or method in combined and independent fuel-cell stack modes. Inputs and parameters represented in FIGS. 6-8 are as follows: T3—Stack A (20) inlet temperature; T4—Stack A (20) outlet temperature; T5—Stack B (22) inlet temperature; T6—Stack B (22) outlet temperature; Th1—Threshold for difference between delta inlet/outlet of Stack A and Stack B; Th2—lower delta inlet/outlet temperature threshold; Th3—higher delta inlet/outlet temperature threshold; Th4—threshold for max fan (40, 64) speed; Th5—threshold for closing bypass valves (42, 6); Th6—threshold for minimal pump (40, 64) flow; Th7 threshold for enabling waste heat recovery; CH(2)—cabin heating lookup table; SSA start signal for stack A (20); SSB start signal for stack B (22); PPx—pump 1 (36), 2 (60), 3 (142), etc.; Hx—heater (144) 1, 2, etc.; Vx—bypass valve 1 (42), 2 (66), etc.; HTL—cabin, battery, heating loop (140).

FIG. 6 illustrates operation of a system or method for controlling a TMS operating in a combined stacks mode. As determined at block 608, combined operation may be performed with both (all) fuel-cell stacks operating. All fuel-cell stacks may also be operated in an independent control mode as illustrated in FIG. 7 to accommodate differences in stack operation associated with component variation, aging, flow rates, ram air, etc. If both (all) fuel cells are operating in combined mode as determined at 608, the control strategy proceeds as represented in FIG. 6. Control logic represented at 610 results in dissipating heat into the heating subloop 140 without using the heat, i.e. operating as a heat sink. Control logic represented at 620 results in heating of the coolant via operation of the fuel-cell stacks, while control logic represented at 630 results in isolating the fuel cells and operating the PTC heaters (H1 and H2) to heat the coolant. Control logic represented at 640 operates the fans and bypass valves while control logic represented at 650 operates the pumps based on the corresponding temperatures of the fuel cell inlets/outlets. As generally illustrated in FIG. 6, the controller is configured to control each heat exchanger bypass valve and fan speed in response to an inlet temperature of a respective one of the plurality of fuel cells, and to control each pump speed in response to a delta temperature between an inlet and outlet of the respective one of the plurality of fuel cells.

FIG. 7 is a diagram illustrating operation of a system or method for controlling a TMS operating in an independent fuel-cell stacks mode with both (all) fuel-cell stacks operating as represented at 708 similar to the combined operation illustrate in FIG. 6, but with the proportional mixing/isolation valve(s) controlled to operate in the isolation position as represented at 700. Control logic represented at 710 results in dissipating heat into the heater core and battery loop without using the heat energy, i.e. operating as a heat sink and increasing the thermal mass. Control logic represented at 720 results in heating of the coolant via operation of the fuel-cell stacks (PTC heaters H1 and H2 off), while control logic represented at 730 results in isolating the fuel cells and operating the PTC heaters (H1 and H2) to heat the coolant. Control logic represented at 740 operates the fans (F1 (40) and F2 (64)) and bypass valves (V1 (42) and V2 (66)) while control logic represented at 750 operates the pumps (PP1 (36), PP2 (60)) based on the corresponding temperatures of the fuel cell inlets/outlets. As generally illustrated in FIG. 7, the controller is configured to control each heat exchanger bypass valve and fan speed in response to an inlet temperature of a respective one of the plurality of fuel cells, and to control each pump speed in response to a delta temperature between an inlet and outlet of the respective one of the plurality of fuel cells while operating in the independent mode, similar to operation in the combined mode of FIG. 6.

FIG. 8 is a diagram illustrating operation of a system or method for controlling a TMS operating with a first fuel-cell stack operating and a second fuel-cell stack not operating as represented at 808. The associated proportional mixing valve is controlled to a mixing position as represented at 800. Control logic represented at 810 results in dissipating heat into the heater core and battery loop without using the heat energy, i.e. operating as a heat sink and increasing the thermal mass. Control logic represented at 820 results in heating of the coolant via operation of the fuel-cell stacks (PTC heaters H1 and H2 off), while control logic represented at 830 results in isolating the fuel cells and operating the PTC heaters (H1 and H2) to heat the coolant. Control logic represented at 840 operates the fans (F1 (40) and shuts down F2 (64)) and bypass valves (V1 (42) and V2 (66)) while control logic represented at 850 operates the pump PP1 (36) based on the corresponding temperatures of the fuel cell inlets/outlets and associated thresholds and PP2 (60) to a constant speed. As generally illustrated in FIG. 8, the controller is configured to control each heat exchanger bypass valve and the operating fan speed in response to an inlet temperature of a respective one of the plurality of fuel cells, and to control each operating pump speed in response to a delta temperature between an inlet and outlet of the respective one of the plurality of fuel cells while operating in the independent mode with only a single fuel cell-stack operating.

While not explicitly illustrated, those of ordinary skill in the art will recognize that the control strategy of FIG. 8 for operating with fuel cell 20 active and fuel cell 22 inactive is substantially similar to the control strategy for reciprocal operation with fuel cell 20 inactive and fuel cell 22 active. Likewise, the control strategy of FIG. 8 provides a representative control strategy generally applicable to operation of coolant circuits of a coupled pair of fuel-cell stacks with one of the fuel-cell stacks active and the other fuel-cell stack inactive.

FIGS. 9-14 illustrate multi-stack configurations and operating modes for a fuel cell system or method according to the present disclosure. For heavy duty applications such as marine, locomotive, and stationary applications (such as generators) powered by multiple fuel cell stacks, the versatile thermal management system may include a valve block that allows isolation of one or more stacks from the remaining stacks. Various applications may include standby stacks that can be switched on and off to meet a wide range of variable power demand for extended operation times without stopping. A valve block having a number of proportional mixing valves that may be cascaded in two or more layers allows selective mixing or isolation of coupled pairs or groups of stacks and related coolant circuits operatable independently or in combination. Individual stacks and corresponding cooling subloops can exchange energy (all modes) to operate the system at peak efficiency to meet current demand for current operating conditions, such as ambient temperature and ram air, for example. Using multiple controllable actuators (pumps, bypass valves, fans, proportional mixing valves, etc.) in addition to facilitating independent or combined operation, also provides redundancy in the event of a single component malfunction and reduces the probability or necessity of a total system shutdown.

Figure 9:
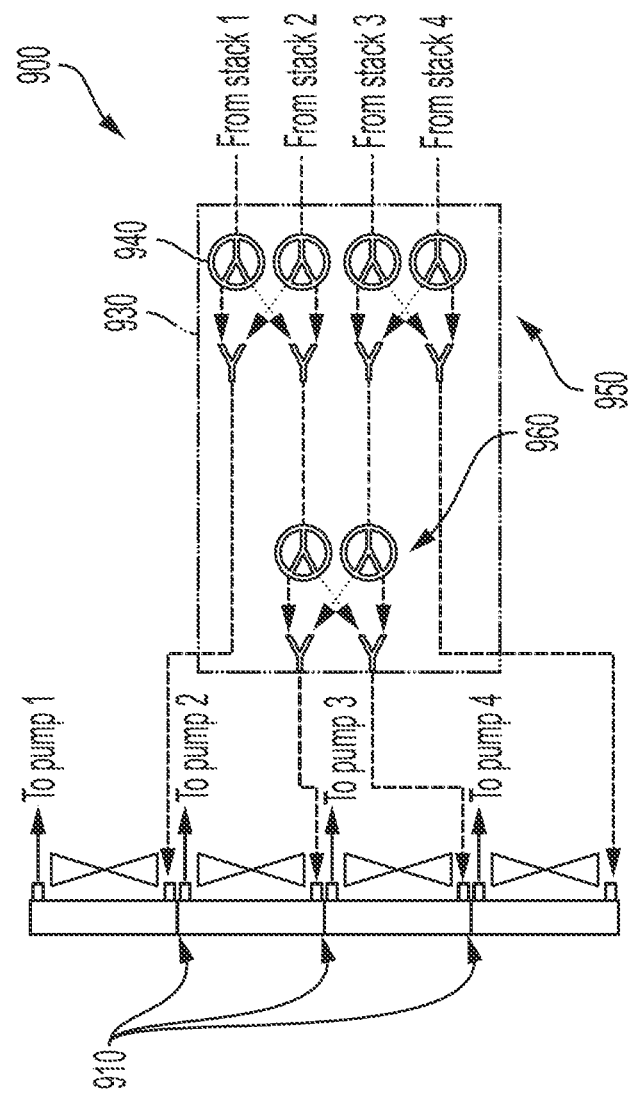
FIG. 9 is a diagram illustrating a representative multi-stack configuration for a fuel cell system in a heavy-duty vehicle or stationary application.

FIG. 9 is a diagram illustrating a representative multi-stack configuration for a fuel cell system in a heavy-duty vehicle or stationary application. System 900 includes four fuel-cell stacks with corresponding coolant circuits including an air-cooled common radiator having a header tank with internal baffles 910 for radiator separation, associated fans 920 and pumps (not illustrated). A valve block 930 includes a plurality of proportional mixing valves 940 arranged in a cascaded configuration with a first layer 950 coupled to a second layer 960. First layer 950 includes four valves 940 coupled to second layer 960, which includes two valves 940. The valves 940 are operable in an isolation position or a proportional mixing position as previously described and are illustrated in an isolation position such that all fuel-cell stacks are isolated from each other. Other operating modes or configurations of a representative system are illustrated in FIGS. 11-14.

Figure 10:
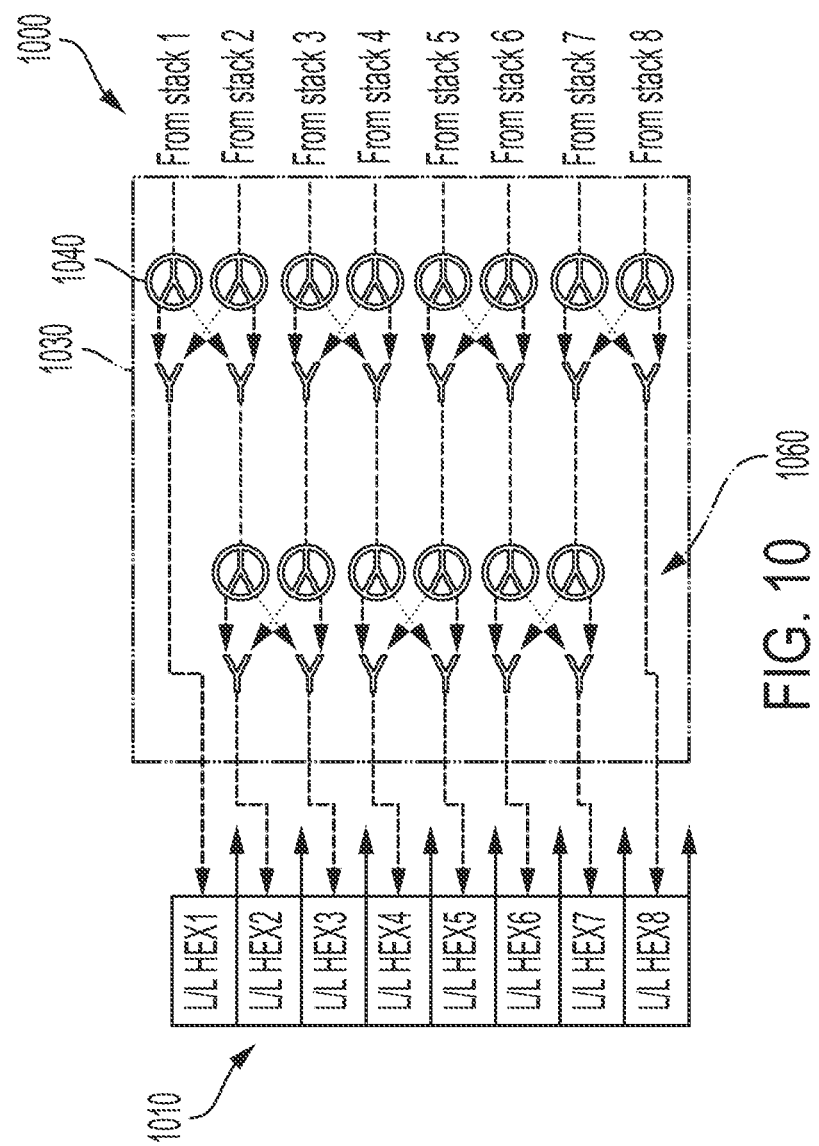
FIG. 10 is a diagram illustrating another representative multi-stack configuration for a fuel cell system in a heavy-duty vehicle or stationary application.

FIG. 10 is a diagram illustrating another representative multi-stack configuration for a fuel cell system in a heavy-duty vehicle or stationary application. System 1000 is an eight-stack configuration with a liquid-to-liquid (L/L) heat exchanger (HEX) pack 1010 that may be used in marine or stationary applications. Radiators or L/L HEX can be split and packaged independently based on available space. Marine applications may use external water to cool the L/L HEX, while stationary applications may utilize utility water. Valve block 1030 may include a plurality of proportional mixing valves 1040 arranged in a first layer 1050 and a second layer 1060. Valves 1040 are illustrated in an isolation position but may be operated in a mixing position to mix coolant from grouped or paired coolant circuits based on fluid coupling through the first layer 1050 and second layer 1060.

FIGS. 11-14 illustrate operating modes for a multi-stack system including four fuel-cell stacks, such as illustrated in FIG. 9.

FIG. 11 is a diagram illustrating a first representative control mode for a multi-stack configuration. The valves illustrated in FIG. 11 are controlled to fluidly couple coolant circuits of stacks 1 and 2, and to fluidly couple coolant circuits of stacks 3 and 4. Coupled circuits for stacks 1 and 2 are isolated from coupled stacks 3 and 4.

FIG. 12 is a diagram illustrating a second representative control mode for a multi-stack configuration. The valves illustrated in FIG. 12 are controlled to fluidly couple coolant circuits of stacks 1 and 2, while coolant circuits for stacks 3 and 4 are isolated from each other, as well as from coolant circuits for stacks 1 and 2. As one non-limiting example, this mode may be used in a cold start where stack 1 is used to warmup stack 2 prior to starting, with stack 3 and 4 inactive or off.

Figure 13:
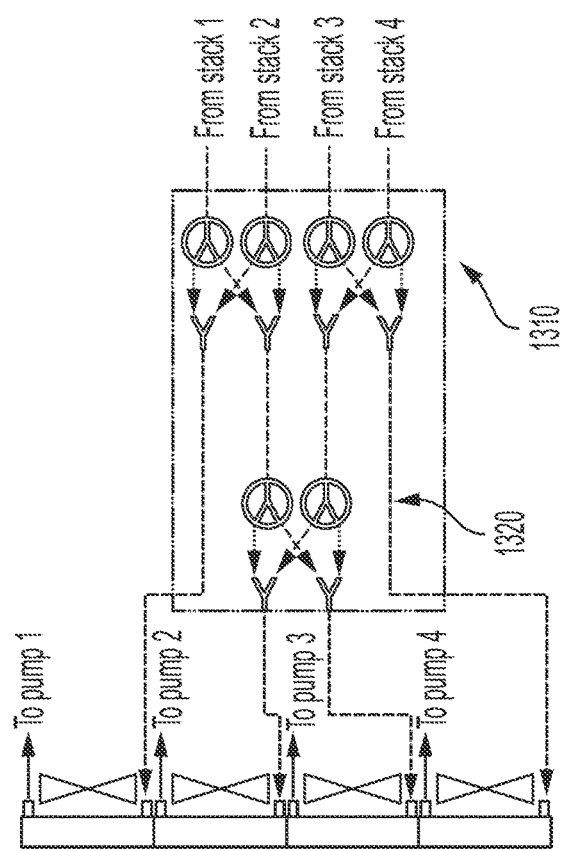
FIG. 13 is a diagram illustrating a third representative control mode for a multi-stack configuration.

FIG. 13 is a diagram illustrating a third representative control mode for a multi-stack configuration. The valves illustrated in FIG. 13 include first-layer valves 1310 controlled to couple coolant circuits of stacks 1 and 2, and coolant circuits of stacks 3 and 4, with second-layer valves 1320 controlled to couple coolant circuits of stacks 2 and 3 such that all four coolant circuits are coupled.

Figure 14:
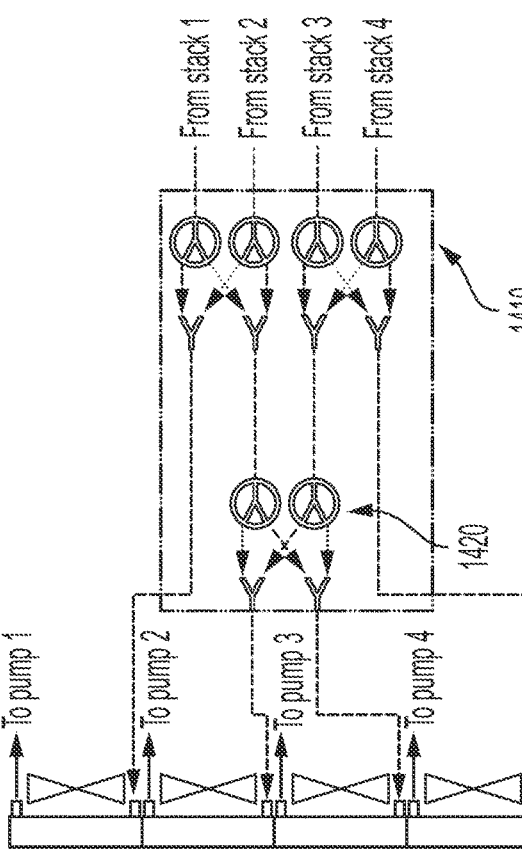
FIG. 14 is a diagram illustrating a fourth representative control mode for a multi-stack configuration.

FIG. 14 is a diagram illustrating a fourth representative control mode for a multi-stack configuration. The valves illustrated in FIG. 14 include first-layer valves 1410 controlled to isolate the coolant circuits of stacks 1-4 from each other. Second-layer valves 1420 controlled to couple coolant circuits of stacks 2 and 3. As one non-limiting example, this mode may be used where stack 2 is operated to warmup stack 3 with stack 4 inactive or off.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    first and second fuel-cell stacks;
    a first coolant circuit having conduit and a first pump arranged to circulate coolant through the first fuel-cell stack;
    a second coolant circuit having conduit and a second pump arranged to circulate coolant through the second fuel-cell stack;
    an isolation valve assembly configured to control flow of coolant between the first and second coolant circuits, the isolation valve assembly having an isolation position that isolates coolant in the first and second coolant circuits and at least one mixing position that directs at least a portion of coolant from the first coolant circuit to the second coolant circuit and at least a portion of coolant from the second coolant circuit to the first coolant circuit; and
    a controller programmed to control the isolation valve assembly in response to at least one of a vehicle load and ambient temperature exceeding a respective threshold to operate in the at least one mixing position, to operate the first pump to circulate coolant through the first fuel-cell stack while the first fuel-cell stack is operating, and to operate the second pump to circulate coolant through the second fuel-cell stack while the second fuel-cell stack is shut down.

2. The vehicle of claim 1 wherein the controller is programmed to operate the first pump at a first speed and the second pump at a second speed less than the first speed.

3. The vehicle of claim 2 wherein the second speed is between 50%-60% of the first speed.

4. The vehicle of claim 1 wherein the isolation valve assembly comprises:
    a first inlet port connected to the conduit of the first coolant circuit;
    a first outlet port connected to the conduit of the first coolant circuit;
    a second inlet port connected to the conduit of the second coolant circuit;
    a second outlet port connected to the conduit of the second coolant circuit; and
    valving that directs coolant flow between the first and second inlet ports and the first and second outlet ports to provide: (i) the isolation position in which the first inlet port and the second outlet port are not in fluid communication and the second inlet port and the first outlet port are not in fluid communication so that the first and second circuits are isolated, and (ii) the at least one mixing position in which the first inlet port and the second outlet port are in fluid communication and the second inlet port and the first outlet port are in fluid communication so that the first and second circuits are in fluid communication.

5. The vehicle of claim 4 wherein the valving includes a first valve configured to proportion coolant between the first inlet and the first and second outlets and a second valve configured to proportion coolant between the second inlet and the first and second outlets.

6. The vehicle of claim 5 wherein the first and second valves are synchronized with each other and the proportion of coolant circulating between the first inlet and the second outlet is equal to the proportion of coolant circulating between the second inlet and the first outlet.

7. The vehicle of claim 5 wherein the controller is further programmed to control the first and second valves of the isolation valve assembly to proportion coolant circulating between the first inlet and the second outlet relative to coolant circulating between the second inlet and the first outlet based on a coolant temperature difference between the first coolant circuit and the second coolant circuit.

8. The vehicle of claim 1 wherein the controller is further programmed to, in response to both the first fuel-cell stack and the second fuel-cell stack operating, control the isolation valve assembly to operate in the isolation position, and control the first and second pumps to maintain a first target temperature difference between an inlet and an outlet of the first fuel-cell stack, and to maintain a second target temperature difference between an inlet and an outlet of the second fuel-cell stack.

9. The vehicle of claim 1 further comprising:
a first heat exchanger coupled to the first coolant circuit;
a first fan operable to direct airflow to the first heat exchanger;
a first bypass valve operable to bypass coolant flow of the first coolant circuit around the first heat exchanger;
a second heat exchanger coupled to the second coolant circuit;
a second fan operable to direct airflow to the second heat exchanger; and
a second bypass valve operable to bypass coolant flow of the second coolant circuit around the second heat exchanger,
wherein the controller is further programmed to, while the first and second fuel-cell stacks are operating:
control the isolation valve assembly to operate in the isolation position;
control the first bypass valve and speed of the first fan in response to an inlet temperature of the first fuel-cell stack; and
control speed of the first pump in response to a temperature difference between the inlet temperature and an outlet temperature of the first fuel-cell stack.

10. The vehicle of claim 9 wherein the controller is further programmed to, while the first and second fuel-cell stacks are operating:
control the second bypass valve and the second fan speed in response to an inlet temperature of the second fuel-cell stack; and
control the second pump speed in response to a temperature difference between the inlet temperature and an outlet temperature of the second fuel-cell stack.

11. A method for controlling a vehicle, the method comprising, by a vehicle controller:
while only one of a first fuel cell and a second fuel cell is operating, controlling at least one valve to combine coolant from a first coolant circuit having a first pump operable to circulate the coolant through the first fuel cell and a second coolant circuit having a second pump operable to circulate the coolant through the second fuel cell, and
controlling the first pump and the second pump to circulate the coolant through the first coolant circuit and the second coolant circuit.

12. The method of claim 11 wherein when the first fuel cell is operating and the second fuel cell is not operating, controlling the first pump and the second pump includes operating the first pump at a first speed and the second pump at a second speed, the second speed lower than the first speed.

13. The method of claim 12 wherein the second speed is less than 60% of the first speed.

14. The method of claim 11 further comprising:
controlling speed of a first fan associated with a first heat exchanger, and a first bypass valve operable to route a least a portion of coolant of the first coolant circuit around the first heat exchanger to maintain a target inlet temperature of the first fuel cell; and controlling speed of the first pump in response to a difference between an inlet temperature and an outlet temperature of the first fuel cell.

15. The method of claim 14 further comprising:
controlling speed of a second fan associated with a second heat exchanger, and a second bypass valve operable to route at least a portion of coolant of the second coolant circuit around the second heat exchanger; and
controlling speed of the second pump in response to a difference between inlet temperatures of the first and second fuel cells.

16. A system comprising:
a plurality of fuel cells;
a plurality of coolant circuits each of which is associated with a respective one of the plurality of fuel cells, each coolant circuit including a heat exchanger, a fan arranged to provide airflow to the heat exchanger, a heat exchanger bypass valve, and a pump configured to circulate coolant through the coolant circuit;
a proportional valve assembly coupled to each pair of coolant circuits and configured to control coolant flow between the coupled pair of coolant circuits; and
a controller configured to control each heat exchanger bypass valve and fan speed in response to an inlet temperature of a respective one of the plurality of fuel cells, and to control each pump speed in response to a delta temperature between an inlet and outlet of the respective one of the plurality of fuel cells.

17. The system of claim 16, wherein the controller is further programmed to control the proportional valve assembly to isolate the coolant circuits of the coupled pair of coolant circuits from one another.

18. The system of claim 16 wherein the controller is further programmed to, in response to at least one of load and ambient temperature exceeding an associated temperature:
control the proportional valve assembly to mix coolant between the coupled pair of coolant circuits;
operate a first fuel cell associated with a first one of the coupled pair of coolant circuits, and shutdown a second fuel cell associated with a second one of the coupled pair of coolant circuits; and
control a first pump associated with the first one of the coupled pair of coolant circuits to operate at a first speed and a second pump associated with the second one of the coupled pair of coolant circuits of the coupled pair of coolant circuits to operate at a second speed less than 75% of the first speed.

19. The system of claim 18 wherein the controller is further programmed to, for each operating fuel cell of the plurality of fuel cells:
control an associated heat exchanger bypass valve to selectively route at least a portion of coolant around an associated heat exchanger and control speed of an associated fan to maintain a target inlet temperature of an associated fuel cell; and
control speed of an associated pump in response to a difference between an inlet temperature and an outlet temperature of the associated fuel cell.

20. The system of claim 19 wherein the system comprises at least four fuel cells, coolant circuits, heat exchangers, heat exchanger bypass valves, fans, pumps and proportional valve assemblies.

* * * * *